US006978684B2

(12) United States Patent
Nurse

(10) Patent No.: US 6,978,684 B2
(45) Date of Patent: Dec. 27, 2005

(54) APPAREL THAT DYNAMICALLY, CONSCIOUSLY, AND/OR REFLEXIVELY AFFECTS SUBJECT PERFORMANCE

(75) Inventor: Matthew Anthony Nurse, Lake Oswego, OR (US)

(73) Assignee: Nike, Inc., Beaverton, OR (US)

( * ) Notice: Subject to any disclaimer, the term of this patent is extended or adjusted under 35 U.S.C. 154(b) by 70 days.

(21) Appl. No.: 10/704,122

(22) Filed: Nov. 10, 2003

(65) Prior Publication Data

US 2005/0097970 A1 May 12, 2005

(51) Int. Cl.[7] .......... G01D 7/00
(52) U.S. Cl. .......... 73/862.041
(58) Field of Search .......... 73/862.041–862.046, 73/172; 702/138, 141–142, 150, 155, 160, 702/182; 36/140, 143, 144; 600/592, 587

(56) References Cited

U.S. PATENT DOCUMENTS

| | | | | |
|---|---|---|---|---|
| 5,813,864 | A * | 9/1998 | Ikuta | 434/253 |
| 6,024,575 | A * | 2/2000 | Ulrich | 434/236 |
| 6,270,403 | B1 * | 8/2001 | Watanabe et al. | 463/7 |
| 6,666,831 | B1 * | 12/2003 | Edgerton et al. | 600/587 |
| 6,732,456 | B2 | 5/2004 | Hussain | |
| 2003/0009308 | A1 | 1/2003 | Kinley | |

OTHER PUBLICATIONS

Brian E. Maki et al., "Effect of Facilitation of Sensation From Plantar Foot-Surface Boundaries on Postural Stabilization in Young and Older Adults," *Journal of Gerontology*: MEDICAL SCIENCES, pp. M281-M287, dated 1999.

M.C. Do et al., "Influence of Plantar Cutaneous Afferents on Early Cpmpensatory Reactions to Forward Fall," *Experimental Brain Research*, 79:319-324. dated 1990.

J. Duysens et al., "Gating of Sensation and Evoked Potentials Following Foot Stimulation During Human Human Gait," *Experimental Brain Research*, 105:423-431. dated 1995.

R. Hayashi et al., "The Functional Role of Sensory Inputs from the Foot: Stabilizing Human Standing Posture During Voluntary and Vibration-Induced Body Sway," *Neuroscience Research*, 5, pp. 203-213, dated 1988.

Anne Kavounoundias et al., "The Plantar Sole is a 'Dynamometric Map' for Human Balance Control, " *Neuro Report*, vol. 9, No. 14, pp. 3247-3252, dated 1998.

Anne Kavounoudias et al., "Specific Whole-Body Shifts Induced by Frequency-Modulated Vibrations of Human Plantar Soles," *Neuroscience Letters*, 266, pp. 181-184, dated 1999.

Stephen D. Perry et al., "The Role of Plantar Cutaneous Mechanoreceptors in the Control of Compensatory Stepping Reactions Evoked by Unpredictable, Multi-Directional Peturbation," *Brain Research*, 877, pp. 401-406, dated 2000.

(Continued)

*Primary Examiner*—Harshad Patel
*Assistant Examiner*—Corey D. Mack
(74) *Attorney, Agent, or Firm*—Banner & Witcoff, Ltd.

(57) ABSTRACT

Pieces of apparel, such as foot-receiving devices (e.g., shoes, socks, or the like), form systems and perform methods for applying stimulus to at least a portion of a subject's body to dynamically and/or reflexively affect the subject's performance, motion, orientation, balance, timing, or the like. Such systems and methods may include or utilize: a piece of apparel, e.g., for applying the stimulus to a portion of the subject's body; an input that receives information relating to a first parameter associated with the subject's performance, motion, orientation, balance, timing, or the like; and a stimulator device that applies the stimulus to the subject's body located in or adjacent to the piece of apparel based on the first parameter. The systems and methods further may include a sensor that senses the first parameter and provides information to the system.

55 Claims, 3 Drawing Sheets

OTHER PUBLICATIONS

A.A.M. Tax et al., "Bipedal Reflex Coordination to Tactile Stimulation of the Sural Nerve During Human Running," *Journal of Neurophysiology*, vol. 73, No. 5, May 1995.

Shinobu Toma et al., "Response Characteristics of Cutaneous Mechanoreceptors to Vibratory Stimuli in Human Glabrous Skin," *Neuroscience Letters*, 195, pp. 61-63, dated 1995.

A.B. Vallbo et al., "Properties of Cutaneous Mechanoreceptors in the Human Hand Related to Touch Sensation," *Human Neurobiology*, 3, pp. 3-14, dated 1984.

J.P. Vedel et al., "Response to Pressure and Vibration of Slowly Adapting Cutaneous Mechanoreceptors in the Human Foot," *Neuroscience Letters*, 34, pp. 289-294, dated 1982.

Isamu Watanabe et al., "The Role of the Plantar Mechanoreceptor in Equilibrium Control," *Annals New York Academy of Sciences*, pp. 855-864, dated 1981.

B.M.H. Van Wezel et al., "Aβ Fibers Mediate Cutaneous Reflexes During Human Walking," *The American Physiological Society*, pp. 2980-2986, dated 2000.

Bart M.H. Van Wezel et al., "Dynamic Control of Location-Specific Information in Tactile Cutaneous Reflexes from the Foot during Human Walking," *The Journal of Neuroscience*, pp. 3804-3814, dated May 15, 1997.

Ge Wu et al., "The Significance of Somatosensory Stimulations to the Human Foot in the Control of Postural Reflexes, " *Experimental Brain Research*, 114: pp. 163-169, dated 1997.

E.P. Zehr et al., "Cutaneous Reflexes During Human Gait: Electromyographic and Kinematic Responses to Electrical Stimulatiion," *The American Physiological Society*, pp. 3311-3325, dated 1997.

Internet printout: http://www.cnn.com - Bussing soles show promise for elderly - Oct. 3, 2003.

Mathew A Nurse, "Effects of Cutaneous Afferent Feedback from the Feet On Human Gait Patterns"- Thesis, University of Calgary Archives, dated January, 2003.

Internet printout: http://dsc.discovery.com - Vibrating Shoes for the Imbalanced Elderly, dated Apr. 15, 2003.

* cited by examiner

APPAREL THAT DYNAMICALLY, CONSCIOUSLY, AND/OR REFLEXIVELY AFFECTS SUBJECT PERFORMANCE

FIELD OF THE INVENTION

The present invention relates generally to systems and methods embodied in apparel that apply a stimulus to at least some portion of the wearer's body to dynamically, consciously, and/or reflexively affect the wearer's performance, motion, orientation, balance, timing, or the like. Additionally or alternatively, systems and methods according to at least some examples of the invention may be used to affect the wearer's performance and/or to assist in training the wearer.

BACKGROUND

Conventional apparel, and particularly athletic apparel, is designed to enhance a subject's performance, e.g., to maximize the athlete's performance or to give the athlete an edge over their competition. For example, much athletic apparel today is designed to be lightweight, to wick away moisture, and to provide low wind resistance, to thereby minimize weight effects, heating effects, and wind drag on the athletes that wear it. Such apparel also may be specially designed to protect and support the wearer's body (or a portion thereof) during the athletic activity for which it was designed.

Footwear is no exception. Conventional footwear products protect the feet during a wide variety of different activities, and in many instances, footwear products assist the wearer in better performing the activities at hand. For example, athletic shoes typically contain structures to protect and support an athlete's feet while running, jumping, twisting, swinging, kicking, and the like during athletic activity. Many types of athletic footwear also include spikes, cleats, or other traction devices that assist athletes in gaining or maintaining traction, position, and/or speed, thereby further improving or enhancing their athletic performance.

While conventional apparel, including athletic footwear and other types of footwear, is useful in protecting and supporting the wearer's body, this conventional apparel typically is completely passive in that it does not actively interact with the subject in any manner. For example, in some instances, it may be useful to provide footwear or other apparel items that interact with the wearer, for example, by applying a stimulus to the feet or other parts of the body, to dynamically, consciously, and/or reflexively affect the wearer's performance, motion, orientation, balance, timing, or the like. Moreover, it would be useful in at least some instances to provide footwear or other apparel that interacts with the wearer, for example, by providing dynamic, conscious, and/or reflexive feedback to the subject as a training aid and/or as a performance enhancing aid. Conventional footwear and/or other apparel do not meet these needs.

SUMMARY

Aspects of the present invention relate to systems and methods at least partially embodied in apparel for applying stimulus to at least some portion of the wearer's body to dynamically, consciously, and/or reflexively affect the wearer's performance, motion, orientation, balance, timing, or the like. Such systems and methods may include or utilize: a piece of apparel (such as a shoe, sock, or other foot-receiving device), e.g., for applying a stimulus to a portion of a subject's body; an input that receives information relating to at least a first parameter associated with the subject's performance, motion, orientation, balance, timing, or the like; and at least a first stimulator device that applies a stimulus to a portion of the subject's body located in or adjacent to the piece of apparel based on the first parameter. Application of the stimulus, in at least some examples of the invention, may initiate a dynamic, conscious, and/or reflexive action by the subject. Systems and methods according to at least some examples of the invention further may include or utilize a sensor that senses the first parameter and provides the sensed information to the system and/or activates the stimulator device in response to the sensed first parameter. Although not required in all examples of the invention, the input device, the first stimulator device, and/or the sensor may be included as part of the piece of apparel without departing from the invention.

BRIEF DESCRIPTION OF THE DRAWINGS

The above and other objects, features, and advantages of the present invention will be readily apparent and fully understood from the following detailed description, taken in connection with the appended drawings, in which:

FIG. 1 illustrates an example system for applying stimulus to at least some portion of a subject's body to dynamically, consciously, and/or reflexively affect the subject's performance, motion, orientation, balance, timing, or the like;

DETAILED DESCRIPTION

Figure 1:
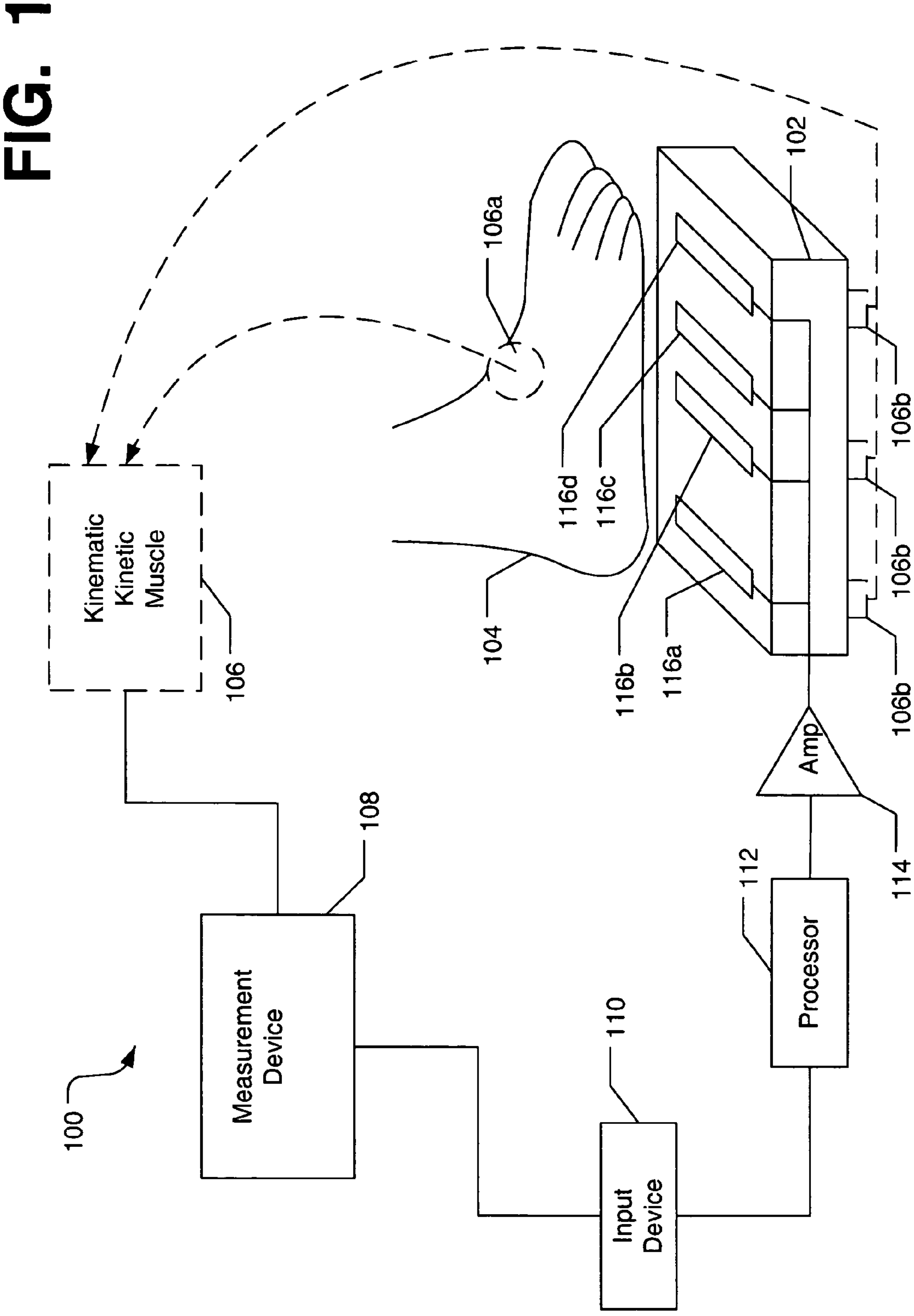

Various specific examples of the invention are described in detail below in conjunction with the attached drawings. To assist the reader, this specification is broken into various subsections, as follows: Terms; The Use of Stimulus to Affect Subject Performance, Motion, Orientation, Balance, Timing, and/or the Like; General Description of Stimulation Systems and Methods According to the Invention; Specific Examples of the Invention; and Conclusion.

A. Terms

The following terms are used in this specification, and unless otherwise noted or clear from the context, these terms have the meanings provided below.

"Foot-receiving device" means any device onto or into which a subject places at least some portion of his or her foot. In addition to all types of footwear, foot-receiving devices include, but are not necessarily limited to: devices for receiving feet during play of video games; devices for receiving feet during athletic or other training; and the like.

"Footwear" means any type of wearing apparel for the feet. This term includes, but is not necessarily limited to: all types of shoes, boots, sneakers, sandals, thongs, flip-flops, mules, scuffs, slippers, sport-specific shoes (such as golf shoes, ski boots, skates, etc.), socks, stockings, hosiery, shoe insoles, and the like.

"Apparel" means any type of wearable material, object, or garment. In addition to footwear, apparel includes but is not necessarily limited to: hats, scarves, gloves, earphones, shirts, sleeves, pants, shorts, skirts, undergarments, exercise clothing, wraps, eyeglasses, goggles, helmets, belts, and the like.

B. The Use of Stimulus to Affect Subject Performance, Motion, Orientation, Balance, Timing, and/or the Like Sensory feedback devices according to aspects of the present invention deliver sensory stimuli to one or more specific areas of the human body, such as the subject's feet. The stimuli can be used in various ways according to the invention. For example, application of the stimuli can improve proprioception, balance, and provide sensory feedback to the subject that may be used to consciously and/or subconsciously (reflexively) alter their performance, motion, orientation, balance, timing, and/or the like in a given task. By providing this sensory feedback information, which in some aspects of the invention serves as a reminder to the subject, a subject can consciously take action based on the information. For example, the subject can consciously change his or her gait in response to receiving the stimulus or feedback (e.g., if pressure sensors determine that there are abnormal pressures or loading patterns on the foot or feet, stimuli could consciously "remind" the subject to alter his/her walking pattern to a more suitable manner, or in severe cases, seek medical/therapeutic interventions).

Aspects of the invention have several potential uses. For example, applying stimuli to a subject can be used to enhance a subject's balance while moving. If a measurement device indicates that a subject's center of pressure or gravity is outside an optimal range, sensory feedback (e.g., by stimulating one or more areas of the body) can be used to warn the subject of his or her unsafe movement pattern. As a more specific example, stimulus may be applied to the subject's feet to warn of the unsafe condition. Application of stimulus to the subject's feet also generally tends to make the subject more aware of his/her foot action, thereby increasing their awareness, balance, and safety.

The present invention, however, is not limited to systems and methods that provide a warning that is consciously used by the subject to change his/her performance, motion, orientation, balance, timing, and/or the like. Rather, at least some aspects of the invention relate to systems and methods that use stimuli to dynamically and/or reflexively affect the subject's performance, motion, orientation, balance, timing, or the like. For example, if an out of balance or poor balance condition is detected (e.g., by the subject's center of gravity being located more than a predetermined safe distance outside the foot position), appropriate nerve endings may be stimulated to quickly induce a reflexive corrective response, which automatically induces the subject to change the body's limb orientations to induce a more stable position. Examples of the powerful reflexive effects that can occur in response to sensory stimulation are evident in the so called "stumbling corrective response." Applying stimulation to areas on the top (dorsum) of the foot during early foot swing (akin to catching the top of the foot on an object while walking) can reflexively induce a person to flex his or her knee, and cause ankle plantar flexion (extend) in an effort to prevent catching a limb on the obstructing object and thus prevent a fall. However, should the same stimulation occur when the foot is close to the ground, (e.g., at the end of a foot swing phase), a different reaction is produced. When the foot is close to the ground, stimulation to an area on the top of the foot can cause a person to extend the knee and dorsiflex the ankle, in an effort to rapidly prepare the foot for ground contact, and prevent a fall. Accordingly, aspects of the invention, in at least some instances, may be useful to prevent a stumble or fall when a subject is out of balance by stimulating nerves to dynamically and reflexively produce an appropriate stumbling corrective response, which induces the subject to reposition his or her legs, ankle and knee joints, and/or other parts of the body to correct the poor balance position and avoid a fall. The effects of nerve stimulation on dynamic and/or reflexive responses will depend on the kind of movement, the location, duration, and intensity of the stimulus (stimuli), the phase of the step cycle (or the timing of the stimulus/stimuli with respect to the specific task being performed), the ability of the subject to "feel" the stimulus (stimuli), and other such factors.

Another aspect of the invention relates to dynamically, consciously, and/or reflexively affecting an orientation of a subject's body during activity. As one example, if pressure sensors at the plantar portion of the foot determine that a subject has abnormal or imperfect pressures or loading patterns, nerves may be stimulated to dynamically, consciously, and/or reflexively reorient and position the foot to a more appropriate position. As another example, when a basketball or volleyball player jumps, injuries can result if the subject does not correctly land on his or her feet, often resulting in twisted, sprained, or broken ankles. By measuring distance from the ground and considering an orientation of the player's foot during descent from the jump, systems and methods according to at least some examples of the invention can predict whether the subject will land properly on his or her feet. If it appears that the subject will not land properly, stimuli may be applied to the proper nerves in the subject's foot and/or leg to dynamically, consciously, and/or reflexively reorient the foot to make a proper landing, thereby preventing and/or at least reducing the severity of any resulting injuries.

Additionally and/or alternatively, by measuring distance from the floor during descent, other nerves may be stimulated, e.g., to dynamically, consciously, and/or reflexively prepare the subject for contact with the floor (e.g., if a knee is locked, a nerve could be stimulated to relax the knee joint and prepare it to absorb the shock of landing).

As another example, aspects of the invention may be used for skill improvement and/or as a training aid to learn new skills. Coordination and timing are critical for a number of sports activities, and proper footwork and/or weight transfer during the activity can greatly assist in improving an athlete's performance. In accordance with at least some aspects of this invention, sensory stimuli can be delivered to different areas of the athlete's body, such as the feet, during a specific movement pattern to inform the subject when his or her movement patterns do not match a preferred or "ideal" standard pattern. For example, during a golf swing, weight is transferred from one foot to the other and then back. One or more preferred or optimal weight shifts for a desired swing type can be determined by evaluating the technique of and collecting data from professional or other high caliber players. Using this data, stimuli may be provided through stimulating devices provided in footwear according to at least some aspects of the invention to help a student practicing or learning the game to mimic the weight shift and foot action of the professional or high caliber player. Not only can the stimuli be provided as a conscious reminder to the student of the proper weight shift, but also if the stimuli are provided at the proper locations on the foot (e.g., if the proper nerves are stimulated), this can dynamically, consciously, and/or reflexively induce the subject to make the correct weight shift during the swing. This can condition the athlete to develop "muscle memory" corresponding to a high quality or ideal golf swing.

Uses of aspects of the invention as a training aid are not limited to practice of a golf swing and/or use in footwork or weight shift training. Rather, stimulation systems and methods for training for any suitable activity can be developed without departing from the invention. For example, the invention may be used to assist in teaching and practicing techniques used in swinging baseball bats and/or hockey sticks; throwing baseballs, softballs, and footballs; kicking footballs and soccer balls; cycling; running; jogging; boxing; martial arts; etc. In such systems and methods, appropriate stimuli may be applied to any of the feet, legs, hands, arms, shoulders, etc., and the appropriate nerves may be stimulated to dynamically, consciously, and/or reflexively affect the student's performance, motion, orientation, balance, timing, or the like and/or to otherwise improve the student's technique.

Another aspect of this invention relates to the use of stimuli to dynamically, consciously, and/or reflexively enhance muscle performance, for example, during an athletic endeavor. Consider a sprinter running a short distance event. Stimulation of specific nerve endings in the feet, lower extremities, or other locations on the body can automatically and/or reflexively change the intensity or timing of muscle activity at specific phases of the movement, resulting in increased performance. As an example, stimulation of specific nerve endings can cause increased soleus and gastrocnemius (calf muscles) activity during cyclical movements, such as running. A stimulus as the foot prepares to push off may assist a sprinter in propulsion and improve the athlete's overall performance. Even if not used in actual competition, repetitive and consistent use of stimulation systems and methods according to some examples of the invention during training (e.g., stimulating specific nerves or areas of the body to increase or decrease muscle activation during sprinting or running) can develop muscle memory and condition the neuromuscular system to prepare for the activity to follow even if and when the stimulation is later removed (e.g., the use of the training aid can condition the muscles and nerves to perform in a certain manner when the runner is running in competition with the training aid removed).

C. General Description of Stimulation Systems and Methods According to the Invention In general, at least some aspects of this invention relate to systems for applying stimulus to at least some portion of the subject's body to dynamically, consciously, and/or reflexively affect the subject's performance, motion, orientation, balance, timing, or the like. Such systems may include a piece of apparel; an input that receives information relating to at least a first parameter associated with a subject's performance, motion, orientation, balance, timing, or the like; and at least a first stimulator device that selectively applies a stimulus to a portion of the subject's body in or adjacent to the piece of apparel based on the first parameter. Systems according to at least some examples of the invention further may include a sensor that senses the first parameter (e.g., an accelerometer, a pressure sensor, a force sensor, a metronome, an electrical sensor, or the like, e.g., to measure impact, distance from the ground, the manner or orientation in which the foot contacts the ground, pressure, force, cadence, temperature, electrical current, electrical resistivity, or the like). The input device, the first stimulator device, and/or the sensor may be included as part of the piece of apparel without departing from the invention.

Any suitable piece of apparel may be used for applying the stimulus without departing from the invention. For example, in at least some examples of the invention the piece of apparel may be associated with and apply stimulus to the subject's foot. In such instances, the piece of apparel may constitute a foot-receiving device, such as a shoe, boot, sock, skate, athletic training device, or other foot-receiving device. Other pieces of apparel may be used to apply a stimulus to any portion of the subject's body in order to affect the subject's performance, motion, orientation, balance, timing, or the like in at least some examples of the invention. For example, the piece of apparel may be a glove, sleeve, shirt, undergarment, shorts, pants, hat, belt, or other type of garment or portion of a garment.

Any type of stimuli that dynamically, consciously, and/or reflexively affects the subject's performance, motion, orientation, balance, timing, or the like may be used without departing from the invention. Examples include: any mechanical stimulus, such as a vibratory stimulus (e.g., high frequency vibration, low frequency vibration, mixtures of different vibration frequencies, dynamically changing frequencies, different amplitudes (e.g., high or low intensities, etc.), dynamically changing amplitudes, etc.; a pressure stimulus (e.g., high pressure, low pressure, vacuum pressure, varying pressure, different pressure application areas (e.g., application of a given pressure stimulus over a larger area may reduce the pressure as compared to application over a smaller area), combinations thereof, etc.); and the like; a temperature stimulus (high temperature, low temperature, changing temperature, etc.); an electrical stimulus; etc. As noted above, one or more characteristics of the applied stimuli may change over time (vibrational frequency, pressure, temperature, etc.), optionally depending on any relevant factor, such as on the value of the measured parameter, the phase within the motion cycle, or the like. Additional examples of characteristics of the stimuli that may be changed depending on relevant factors include: the location(s) for application of the stimulus; the intensity of the applied stimulus; the duration of the applied stimulus; the starting time for applying the stimulus; the ending time for applying the stimulus; and the like. The stimuli also may be applied, for example, only when one or more parameter values fall within predetermined ranges, when they exceed or fall below threshold values, etc.

Additional aspects of the invention relate to methods for applying stimulus to at least some portion of a subject's body to dynamically, consciously, and/or reflexively affect the subject's performance, motion, orientation, balance, timing, or the like. Such systems may include, for example: placing at least a portion of a subject's body in or adjacent to a piece of apparel including at least a first stimulator device (and optionally an input); measuring a first parameter associated with the subject's performance, motion, orientation, balance, timing, or the like and/or receiving information via the input relating to the first parameter; and applying a stimulus to the portion of the subject's body via the first stimulator device based on the first parameter.

Various specific examples of systems and methods according to the invention are described in the following section. Those skilled in the art will understand that this description merely provides examples of the invention and does not limit the invention.

D. Specific Examples of the Invention

The various figures in this application illustrate examples of stimulus applying devices and methods useful according to this invention. When the same reference number appears in more than one drawing, that reference number is used consistently in this specification and the drawings to refer to the same part throughout.

FIG. 1 illustrates an example stimulation system 100 for dynamically, consciously, and/or reflexively affecting a subject's performance, motion, orientation, balance, timing, or the like useful according to at least some examples of the invention. This example system 100 includes a piece of apparel that is located adjacent to some portion of a subject's body when the system 100 is in use. In the illustrated example, the piece of apparel is a "foot-receiving device" 102 that is located adjacent to a subject's foot 104. While the foot-receiving device 102 is shown generically in FIG. 1 as a block diagram, those skilled in the art will appreciate that the foot-receiving device 102 can take on any desired or suitable form, including the various forms described in the definitions of "foot-receiving device" and "footwear" specified above, without departing from the invention.

The system 100 according to this example of the invention senses various parameters or characteristics associated with the subject's performance, motion, orientation, balance, timing, or the like 106, and using this sensed information, provides sensory feedback to the subject to dynamically, consciously, and/or reflexively affect the subject's performance, motion, orientation, balance, timing, or the like. Accordingly, as the subject moves, some aspect of the subject's muscle activation, limb kinematics, and kinetic motion (indicated at reference number 106 in FIG. 1) provides information regarding the subject's performance motion, orientation, balance, timing, or the like. A measurement device 108 detects the available information relating to the subject's performance, motion, orientation, balance, timing, or the like and provides a measured value corresponding to this information to an input device 110 for the stimulation system.

The sensed information regarding the subject's performance, motion, orientation, balance, timing, or the like may be sensed, measured, and/or transmitted to a measurement device 108 or an input device 110 in any suitable manner without departing from the invention. For example, electrodes 106*a* or other appropriate sensors (e.g., accelerometers, goniometers, LVDT voltage transducers, strain gauges, and the like) may be attached to and/or held against the subject's skin to provide information relating to the subject's muscle activation, limb kinematics, and/or kinetic motion to the measurement device 108 and/or input 110. As another example, sensors 106*b*, such as pressure or force sensors, may be provided as part of the foot-receiving device 102 to provide information relating to the orientation of the foot when planted, the force during foot planting, the weight balance or shift, etc. As still another example, sensors 106*b* could constitute ultrasound, radar, laser, or other transmitters/receivers and/or other sensors to measure distance from the ground or floor, acceleration, limb orientation, and the like. Any suitable devices or sensors for measuring any desired parameter associated with the subject's performance, motion, orientation, balance, timing, or the like may be provided without departing from the invention, including: an accelerometer, a pressure sensor, a force sensor, a metronome (for evaluating cyclic or cadence action), an electrical sensor, a temperature sensor, and the like. Commercially available devices and sensors may be used, e.g., in foot-receiving devices or apparel, without departing from the invention.

As will be described in more detail below, a processor 112 (such as a computer chip, a microprocessor, a programmable controller, or the like) receives the input and determines whether the input information or data is such that at least one stimulus treatment should be applied to some area of the subject's foot 104 (or other portion of the subject's body). If it is determined that a stimulus should be applied, the processor 112 will send a signal (optionally through an amplifier 114 and/or other appropriate circuitry) to trigger activation of one or more stimulation devices 116(*a*) through 116(*d*) provided as part of the foot-receiving device 102. The activated stimulation devices 116*a* through 116*d* will then apply stimulation to the subject's foot 104 (or other body part) to dynamically, consciously, and/or reflexively affect the subject's performance, motion, orientation, balance, timing, or the like.

When the subject dynamically, consciously, and/or reflexively reacts to the applied stimulus, the muscle output, kinematic, and/or kinetic characteristics 106 of the movement may change, and this change (if any) may be detected by the measurement device 108 and fed back through the remainder of the system 100 in the general manner described above. Accordingly, changes in the muscle output, kinematic, and/or kinetic characteristics of the subject's performance, motion, orientation, balance, timing, and/or the like may result in a change of the stimulus applied to the foot 104 or other portion of the subject's body over time.

Of course, the various elements illustrated in FIG. 1 are merely examples of devices that may be included in systems and used in methods according to the invention. Numerous changes to the specifically illustrated system may be made without departing from the invention. For example, the input device 110 may constitute an input to the processor 112, which simply accepts data associated with the measured muscle activation, kinetic, or kinematic characteristics of the subject's motion. As another example, the functions of measurement device 108, input device 110, and processor 112 may be performed by a single device that measures and/or otherwise accepts information or data regarding the subject's performance, motion, orientation, balance, timing, or the like and activates a stimulation device, if appropriate, in response to the measured information.

Additionally, information and data may be moved and/or transferred in any suitable or desired manner in systems and methods of the invention without departing from the invention. For example, hard-wired connections, wireless transmissions, and/or combinations thereof may be used to transmit data and information in systems and methods according to the invention, for example: to transmit muscle activation data, kinetic data, kinematic data, or other data regarding the subject's performance, motion, orientation, balance, timing, or the like to a measurement device; to transmit the raw data or measured data to a computer processor; to transmit stimulator activation signals to the stimulator devices; etc. If desired, known or conventional data transmission and processing systems and methods may be used without departing from the invention.

Figure 2:
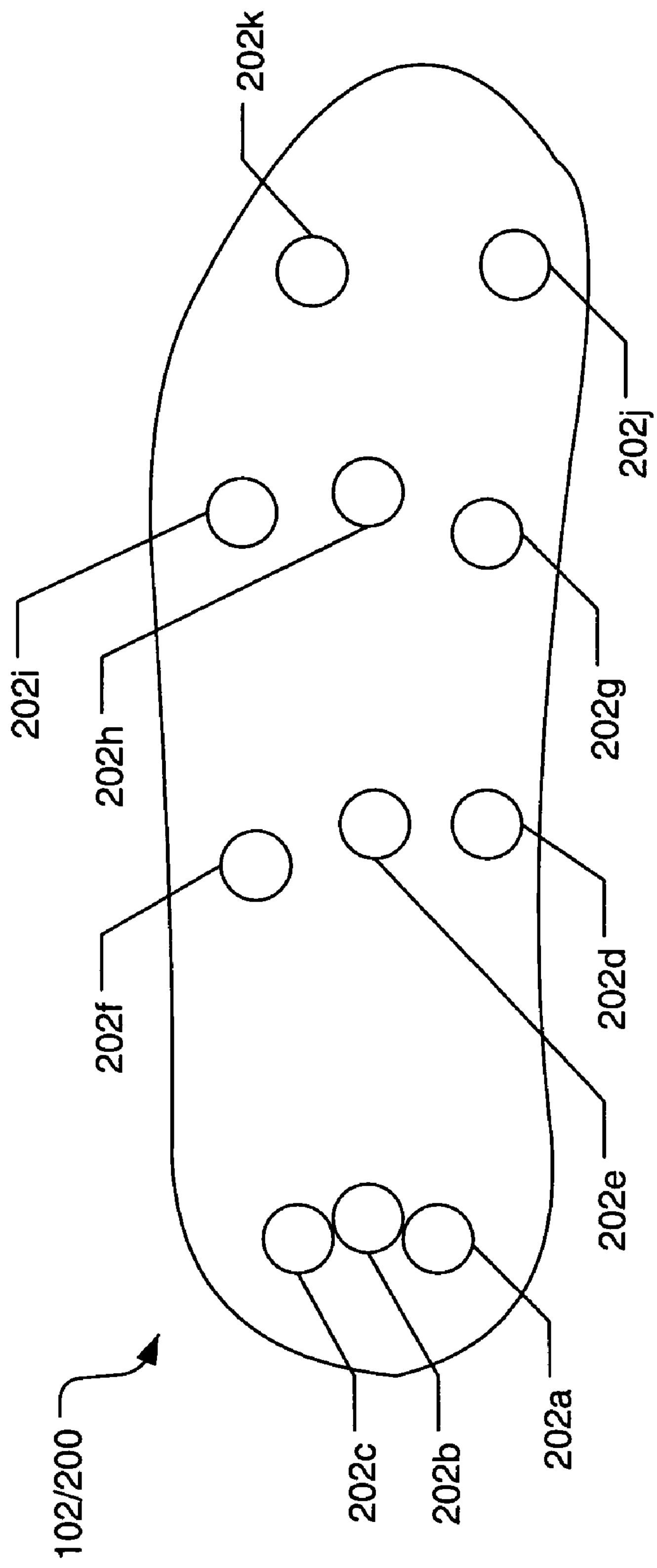
FIG. 2 illustrates an example of potential locations for stimulating devices to apply stimulus or stimuli to a plantar region of a subject's foot in at least some examples of the invention.

FIG. 2 illustrates an example foot-receiving device 102/200 that may be used to apply stimulus to a subject's foot in accordance with at least some examples of this invention. In this illustrated example, the foot-receiving device 200 is a shoe footbed or an insole that may be formed as an integral part of a shoe and/or as an independent device insertable into a shoe. Of course, the foot-receiving device 200 could take on any other suitable form without departing from the invention. For example, the foot-receiving device 200 could form an integral portion of a shoe, such as a midsole of the shoe or the like. As another example, the foot-receiving device 200 could form a sock or stocking into which the subject's foot is inserted, without departing from the invention.

The foot-receiving device 200 in this illustrated example includes several independently activatable stimulation devices 202(*a*) through 202(*k*). Stimulation devices 202(*a*), 202(*b*), and 202(*c*) stimulate the medial heel, mid heel, and lateral heel regions of the foot, respectively (and generally correspond to stimulation device 116*a* shown in FIG. 1). Stimulation devices 202(*d*), 202(*e*), and 202(*f*) stimulate the medial arch, transverse arch, and lateral arch (e.g., the base of the fifth metatarsal) regions of the foot, respectively (and generally correspond to stimulation device 116*b* shown in FIG. 1). Stimulation devices 202(*g*), 202(*h*), and 202(*i*) stimulate the first metatarsal head (ball of the foot), the third metatarsal head, and the fifth metatarsal head regions of the foot, respectively (and generally correspond to stimulation device 116*c* shown in FIG. 1). Stimulation devices 202(*j*) and 202(*k*) stimulate the big toe (hallux) and one or more of the other toes, respectively (and generally correspond to stimulation device 116*d* shown in FIG. 1). Of course, any number of stimulation devices may be included in systems and methods according to the invention, and the stimulation devices may stimulate any area of the foot, including any of the areas specifically illustrated in FIG. 2, other areas in the sole of the foot, other areas on the lateral side of the foot and/or on top of the foot, on the ankle, on the heel, etc. Additionally, as noted above, the stimulation areas are not limited to regions of the foot. Any areas or regions of the subject's body may be stimulated without departing from the invention.

Any suitable stimulation device(s) or combination of stimulation devices may be used without departing from the invention. For example, the stimulation devices may include vibrating devices, pressure applying devices (such as pistons or actuators), temperature applying devices, electrical stimulation devices, and the like. As specific examples, vibrating devices like vibrator motors used in cellular telephones, pagers, and the like may be incorporated into foot-receiving devices or other apparel items in various examples of the invention. Also, if desired, a single piece of apparel or foot-receiving device may contain more than one type of stimulation device without departing from this invention. Additionally, if desired, different types of stimulation may be applied to one area of the body, simultaneously or at different times, without departing from the invention.

When provided directly as part of a piece of apparel or foot-receiving device, the sensors (like sensors 106*a* and 106*b* in FIG. 1) may be provided in any number and/or at any location without departing from the invention. For example, when force or pressure sensors are provided, they may be provided at various positions, such as at or near the various stimulator device positions 202*a* through 202*k* shown in FIG. 2. By placing multiple force or pressure sensors around the foot-receiving device, activation of the different sensors over time and their readings can provide information regarding the orientation of the foot as it is planted on the ground. Premature or early activation of sensors on a side area of the foot may indicate poor orientation of the foot as it is planted. In that instance, prompt activation of stimulating devices, in at least some instances, can dynamically, consciously, and/or reflexively cause the subject to reorient the foot to a better landing or planting position, thereby improving the subject's gait or landing position and/or avoiding or minimizing injury. Of course, different types of sensors at varying positions measuring various different parameters may be provided without departing from the invention. Also, the sensor(s) may be located at the same portion of the apparel or foot-receiving device as the stimulating device(s), or they may be located at other portions of the apparel or foot-receiving device. In some examples, one or more sensors may be located at least partially independent from the apparel or foot-receiving device(s) (e.g., an optical, infrared, ultrasound, or other transmitter/receiver system). Commercially available sensors and detecting technology may be used without departing from the invention.

Figure 3:
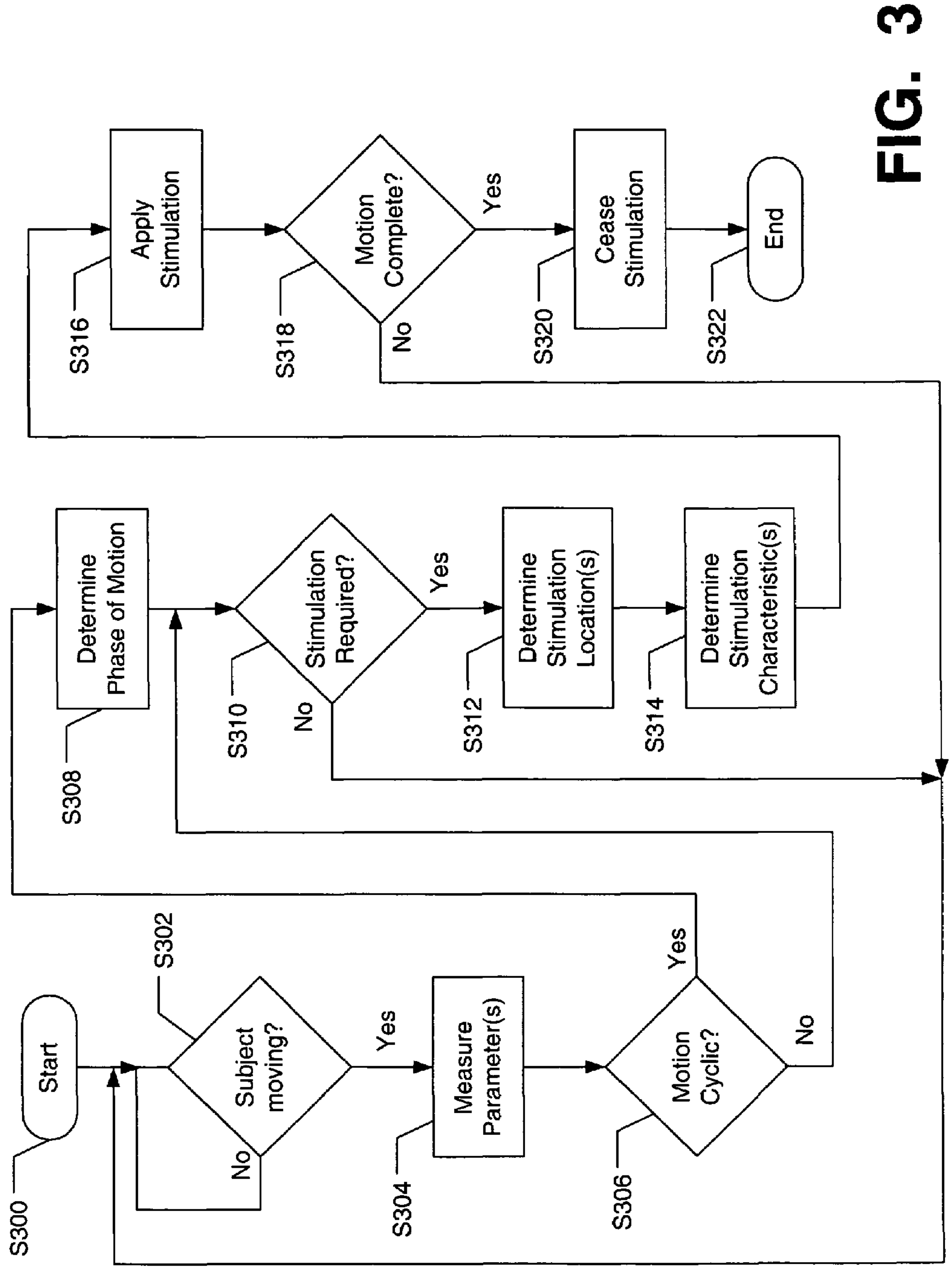
FIG. 3 illustrates a flow diagram of an example procedure for applying stimulus to a subject in accordance with at least some examples of the invention.

FIG. 3 illustrates an example procedure or method for applying stimulus to a subject's body in accordance with at least some examples of this invention. As the procedure starts (S300), systems and methods according to this example of the invention determine whether the subject under consideration is moving (S302). This can be accomplished in any suitable manner without departing from the invention, including in conventional manners known to those in the art. For example, sensors associated with examples of systems and methods of the invention may include an accelerometer, a ground force sensor, a pressure sensor, a motion detector, or the like that may be used to determine whether the subject is moving in some manner. If the subject is not moving (answer "No"), systems and methods according to this example of the invention return to S302 (optionally after some suitable time delay) and determine again at a later time whether the subject is moving. Of course, if necessary or appropriate, the absence of movement in S302 may indicate a need to apply a stimulus, e.g., to induce or initiate motion, without departing from the invention. Alternatively or optionally, procedures like those described in FIG. 3 may be triggered when subject movement is detected.

If the subject is moving at S302 (answer "Yes"), then the desired parameter(s) associated with the subject's performance, motion, orientation, balance, timing, or the like are measured (S304). As described in detail above, the measured parameter(s) may include, for example: the body's center of pressure (optionally relative to foot location or position), plantar pressure, ground impact force, ground reaction forces, distance from ground, acceleration, cadence, heel strike and toe-off, and the like. Any desired parameters indicative of subject performance, motion, orientation, balance, timing, muscle activation, kinematic data, kinetic data, and the like may be measured or sensed without departing from the invention.

In at least some examples of systems and methods according to the invention, at S306 a determination will be made as to whether the subject's motion is a cyclic type motion (e.g., a repetitive motion observed while walking, running, jogging, skipping, jumping, etc.). This determination may be made in any suitable manner without departing from the invention. For example, using an accelerometer, a pressure sensor, a metronome, and/or an impact force sensor, impact of a subject's foot with the ground can be sensed. If this impact is sensed repeatedly and regularly (e.g., within predefined limits), systems and methods according to this example of the invention may then determine that the subject's motion is cyclic. If the motion is determined to be cyclic at S306 (answer "Yes"), the present time or "phase" in the cyclic motion then may be determined (S308). The phase of the cyclic motion may affect one or more specific characteristics of the stimulation to be applied to the subject (e.g., as noted above, the phase of motion may impact the reflexive reaction produced in response to certain stimuli). If the motion is determined to not be cyclic at S306 (answer "No"), step S308 is skipped. Of course, in some situations or examples, the phase of the motion still may be determined even if the overall motion is not purely cyclic (e.g., the position of limbs and/or weight transfer in a golf swing or the like).

Once the necessary or desired parameters are measured and the location or phase in the subject's cyclic motion is determined (if cyclic motion exists), systems and methods according to this example of the invention next determine whether any stimuli should be applied to the subject's body (S310). This step also can be accomplished in any suitable manner without departing from the invention. For example, systems and methods according to at least some examples of the invention may take the data corresponding to the measured input parameter(s) (from S304), as well as the data relating to the phase of the subject's motion (from S308), if any, and using a previously provided "look-up table" or data set, determine whether stimuli should be applied to the subject based on the determined data. If it is determined that no stimulus is required (answer "No"), the procedure returns to S302.

If it is determined that application of stimulus is required (answer "Yes" at S310), systems and methods according to this example of the invention then may determine various specific characteristics of the stimulus to be applied based on the input parameters and cyclic phase data. The specific characteristics of the stimulus to be applied may be obtained from any suitable or desirable source, such as from data stored in a computer memory. Such data may be determined by those skilled in the art, for example, from empirical data collected through routine experimentation. As an initial matter, systems and methods according to this example of the invention first may determine the location(s) at which stimulus is (are) to be applied (S312). The stimulus may be applied at any suitable or desired number of locations without departing from the invention, including, for example, at the locations of the various stimulating devices 202(*a*) through 202(*k*) provided in the foot-receiving device 102/200 of FIG. 2.

If desired, various additional characteristics of the stimulus to be applied may be determined, and the specific characteristics may be different at each stimulated location (S314). For example, systems and methods according to at least some examples of the invention first may determine the type(s) of stimulus to apply at the various locations (e.g., one or more of a vibratory stimulus, a pressure stimulus, a temperature stimulus, and/or an electrical stimulus); and/or the intensity of the stimuli at the various location(s); etc. Even more specific characteristics of the stimulus to be applied may be determined in systems and methods according to some examples of the invention. For example, systems and methods according to at least some examples of the invention may determine: the frequency of a vibratory stimulus to apply (e.g., high frequency, low frequency, middle frequencies, mixtures or combinations of different frequencies, different frequencies at different locations, etc.); the amplitude of the frequency to apply (e.g., high amplitude, low amplitude, middle amplitude, mixtures or combinations thereof (e.g., at one or multiple locations), etc.); the intensity of the vibratory stimulus to apply (e.g., high intensity, low intensity, middle intensity, etc.); the intensity of a pressure stimulus to apply (e.g., high pressure, low pressure, negative pressure, combinations thereof (e.g., at one or multiple locations), etc.); the level of a temperature stimulus to apply (e.g., high temperature or low temperature stimuli, different temperatures at different locations, etc.); the voltage or current characteristics of an electrical stimulus to apply; the time length to apply the stimulus at the various locations; etc. Other specific characteristics of the stimuli at the various locations to be applied also may be determined.

Once the relevant characteristics of the stimuli to be applied at the various locations are determined, the stimuli are applied (S316). After the stimulation is applied (S316) (or while it is being applied), the systems and methods according to this example of the invention next determine whether the subject's motion is continuing (S318). If the subject's motion is not complete (answer "No" at S318), the systems and methods return to S302, and the procedure repeats (optionally, because the subject's continued motion was just affirmatively determined at S318, at this time the procedure could return to S304 and simply restart the procedure by re-measuring the desired performance, motion, orientation, balance, timing, or other parameter(s)). In this manner, application of the stimuli and its specific characteristics may be changed over time (e.g., when the procedure of FIG. 3 is repeated, different measured parameters and/or phases within the cyclic motion may dictate changes in the applied stimuli, including, in at least some instances, cessation of one or more (or even all) of the applied stimuli). Accordingly, the cyclic nature of the procedure described in conjunction with FIG. 3 can allow systems and methods according to at least these examples of the invention to dynamically control the stimulation start and end times, and it also supports changes to the various locations and/or other characteristics of the applied stimuli over the course of time (e.g., because the locations and/or other characteristics of the applied stimuli can be changed each time the procedure of FIG. 3 is completed). In this manner, systems and methods according to at least some examples of the invention can dynamically, consciously, and/or reflexively affect the subject's performance, motion, orientation, balance, timing, or the like. Alternatively, information in the data regarding the stimulation characteristics can provide information regarding stimulation start and end times and changes in other characteristics of the stimuli to be applied over time.

If the subject's motion is complete at S318 (answer "Yes"), the systems and methods according to this example of the invention will cease applying the stimulus (S320), and the procedure then ends (S322), optionally while waiting for the subject to resume his or her motion (and thus returning to S302). Also, in at least some instances, data relating to the stimulation characteristics, the measured parameters, and/or the phase of motion may dictate cessation of stimulation, e.g., at the next iteration of S310.

Of course, the specific procedures described above in conjunction with FIG. 3 are merely examples of the manner in which systems and methods according to some examples of the invention may operate. Those skilled in the art will understand that many variations in the procedure are possible without departing from the invention. For example, the various steps described in conjunction with FIG. 3 may be changed, changed in order, additional steps may be added, existing steps may be combined and/or omitted, and the like without departing from the invention. For example, the locations and characteristics of the stimulation to be applied may be ascertained simultaneously with the determination as to whether any stimulation is required. Additionally, in some examples, a determination of whether a subject is actually moving may not be necessary or desired, for example, when trying to maintain balance. Also, in some examples, stimulation may be required in situations when no movement is detected (e.g., to timely initiate or start movement, such as during golf swing training or the like). Many variations in the specific steps, measured parameters, stimulus application, and the like are possible without departing from the invention.

While the specific examples of the invention described above relate to use of a foot-receiving device to apply stimulation to a subject's foot, those skilled in the art will recognize that aspects of this invention can be applied to any type of apparel to apply stimulation to any part of a subject's body without departing from the invention. For example, in addition to use in footwear and foot-receiving devices, stimulation devices may be included in hats, scarves, gloves, earphones, shirts, sleeves, pants, shorts, skirts, undergarments, exercise clothing, wraps, socks, stockings, eyeglasses, goggles, helmets, belts, and the like without departing from the invention. Additionally, the apparel may be arranged to apply a stimulus to any part of the body to dynamically, consciously, and/or reflexively affect the subject's performance, motion, orientation, balance, timing, or the like without departing from the invention, such as any part of the body located adjacent to the various types of apparel described above. As a more specific example, parameters relating to performing motion, orientation, balance, timing, or the like may be determined by knee position, and stimulating devices may be provided, for example, in tight fitting pants or undergarments, to apply stimulation to areas around the knee.

As another potential, example option, systems and methods according to at least some examples of the invention may allow a user or instructor to input information regarding the type of motion that is occurring (e.g., through a computer menu, user interface, or the like). For example, a device to assist in golf swing training would know that the motion is not cyclic, but it still would likely need to determine the phase in the golf swing (e.g., akin to S308 above) when movement should or should not occur so that the proper stimulation can be delivered at the proper timing in the swing. Optionally, in at least some systems and methods according to the invention, information can be entered manually into the system (e.g., the type of movement, when stimulus should be applied (optionally as a function of the phase of the motion), stimulus location, stimulus intensity, etc.). The ability for users to enter and control the various parameters of the stimulus allow instructors and users to customize a stimulation program to comport with their own coaching style and/or philosophy, as well as to comport with the specific needs, desires, or goals of the user.

E. Conclusion

Various examples of the present invention have been described above, and it will be understood by those of ordinary skill that the present invention includes within its scope all combinations and subcombinations of these examples. Additionally, those skilled in the art will recognize that the above examples simply exemplify the invention. Various changes and modifications may be made without departing from the spirit and scope of the invention, as defined in the appended claims.

What is claimed is:

1. A system, comprising:

a foot-receiving device;

an input that receives information relating to at least a first parameter associated with a subject's performance, motion, orientation, timing, or balance; and at least a first stimulator device included as part of the foot-receiving device, wherein the first stimulator device; selectively applies a stimulus to at least a first portion of a subject's foot in or adjacent to the foot-receiving device based on the first parameter so as to affect the subject's performance, motion, orientation, timing, or balance.

2. A system according to claim 1, further comprising:

a sensor that senses the first parameter.

3. A system according to claim 2, wherein the input, and the sensor are included as part of the foot-receiving device.

4. A system according to claim 2, wherein the sensor is selected from the group of: an accelerometer, a pressure sensor, a force sensor, a metronome, and an electrical sensor.

5. A system according to claim 1, wherein the stimulus includes at least one member selected from the group of: a vibratory stimulus, a pressure stimulus, and a temperature stimulus.

6. A system according to claim 1, wherein the stimulus includes a mechanical stimulus.

7. A system according to claim 1, wherein at least a first characteristic of the stimulus is based, at least in part, on the first parameter.

8. A system according to claim 7, wherein the first characteristic is selected from the group of: a location of the stimulus, an intensity of the stimulus, a duration of the stimulus, a starting time for the stimulus, an ending time for the stimulus, and a vibratory frequency for the stimulus.

9. A system according to claim 1, wherein the first parameter includes a member selected from the group of: impact, pressure, force, cadence, temperature, electrical current, and electrical resistivity.

10. A system according to claim 1, wherein the first stimulator device applies the stimulus so as to reflexively affect the subject's performance, motion, orientation, timing, or balance.

11. A system according to claim 1, wherein the first stimulator device applies the stimulus when the first parameter falls within a predetermined range.

12. A system according to claim 1, wherein the subject's motion is a cyclic motion, and at least a first characteristic of the stimulus depends, at least in part, on a phase of the subject's motion in the cycle.

13. A system, comprising:

a piece of apparel including a first stimulator device engaged therewith; and a processor programmed and adapted to: (a) receive an input including information relating to at least a first parameter associated with a subject's performance, motion, orientation, timing, or balance, and (b) providing a signal for selectively activating the first stimulator device that applies a stimulus to a portion of the subject's body in or adjacent to the piece of apparel based on the first parameter so as to affect the subject's performance, motion, orientation, timing, or balance.

14. A system according to claim 13, further comprising:

a sensor that senses the first parameter.

15. A system according to claim 14, wherein the processor and the sensor are included as part of or attached to the piece of apparel.

16. A system according to claim 13, wherein the processor is included as part of the piece of apparel.

17. A system according to claim 13, wherein the first stimulator device applies the stimulus so as to reflexively affect the subject's performance, motion, orientation, timing, or balance.

18. A system according to claim 13, wherein the piece of apparel is a foot-receiving device, and the stimulus is applied to the subject's foot.

19. A system according to claim 18, wherein the foot-receiving device is a piece of footwear.

20. A system according to claim 19, wherein the stimulus is a vibratory stimulus or a pressure stimulus.

21. A method, comprising:

placing a subject's foot in or adjacent to a foot-receiving device including at least a first stimulator device;

measuring at least a first parameter associated with the subject's performance, motion, orientation, timing, or balance; and selectively applying a stimulus to at least a first portion of the subject's foot via the first stimulator device based on the first parameter so as to affect the subject's performance, motion, orientation, timing, or balance.

22. A method according to claim 21, wherein the stimulus includes at least one member selected from the group of: a vibratory stimulus, a pressure stimulus, and a temperature stimulus.

23. A method according to claim 21, wherein at least a first characteristic of the stimulus is based, at least in part, on the first parameter.

24. A method according to claim 23, wherein the first characteristic is selected from the group of: a location of the stimulus, an intensity of the stimulus, a duration of the stimulus, a starting time for the stimulus, an ending time for the stimulus, and a vibratory frequency for the stimulus.

25. A method according to claim 21, wherein the first parameter includes a member selected from the group of: impact, pressure, force, cadence, temperature, electrical current, and electrical resistivity.

26. A method according to claim 21, wherein the stimulus is applied to the subject's foot so as to reflexively affect the subject's performance, motion, orientation, timing, or balance.

27. A method according to claim 21, wherein the stimulus is applied when the first parameter falls within a predetermined range.

28. A method according to claim 21, wherein the subject's motion is a cyclic motion, and at least a first characteristic of the stimulus depends, at least in part, on a phase of the subject's motion in the cycle.

29. A system, comprising:

a piece of apparel;

an input that receives information relating to at least a first parameter associated with a subject's performance, motion, orientation, timing, or balance; and at least a first stimulator device included as part of the piece of apparel, wherein the first stimulator device; selectively applies a stimulus to a portion of the subject's body in or adjacent to the piece of apparel based on the first parameter so as to affect the subject's performance, motion, orientation, timing, or balance.

30. A system according to claim 29, further comprising:

a sensor that senses the first parameter.

31. A system according to claim 30, wherein the input, the first stimulator device, and the sensor are included as part of the piece of apparel.

32. A system according to claim 30, wherein the sensor is selected from the group of: an accelerometer, a pressure sensor, a force sensor, a metronome, and an electrical sensor.

33. A system according to claim 29, wherein the stimulus includes at least one member selected from the group of: a vibratory stimulus, a pressure stimulus, and a temperature stimulus.

34. A system according to claim 29, wherein the stimulus includes a mechanical stimulus.

35. A system according to claim 29, wherein at least a first characteristic of the stimulus is based, at least in part, on the first parameter.

36. A system according to claim 35, wherein the first characteristic is selected from the group of: a location of the stimulus, an intensity of the stimulus, a duration of the stimulus, a starting time for the stimulus, an ending time for the stimulus, and a vibratory frequency for the stimulus.

37. A system according to claim 29, wherein the first parameter includes a member selected from the group of: impact, pressure, force, cadence, temperature, electrical current, and electrical resistivity.

38. A system according to claim 29, wherein the first stimulator device applies the stimulus so as to reflexively affect the subject's performance, motion, orientation, timing, or balance.

39. A system according to claim 29, wherein the first stimulator device applies the stimulus when the first parameter falls within a predetermined range.

40. A system according to claim 29, wherein the subject's motion is a cyclic motion, and at least a first characteristic of the stimulus depends, at least in part, on a phase of the subject's motion in the cycle.

41. A method, comprising:

placing at least a portion of a subject's body in or adjacent to a piece of apparel wherein the piece of apparel includes a first stimulator device engaged therewith;

receiving an input including information relating to at least a first parameter associated with a subject's performance, motion, orientation, timing, or balance; and providing a signal for selectively activating the first stimulator device that applies a stimulus to the portion of the subject's body in or adjacent to the piece of apparel based on the first parameter so as to affect the subject's performance, motion, orientation, timing, or balance.

42. A method according to claim 41, further comprising:

sensing the first parameter.

43. A method according to claim 42, wherein a sensor for sensing the first parameter is included as part of or attached to the piece of apparel.

44. A method according to claim 41, wherein the first stimulator device applies the stimulus so as to reflexively affect the subject's performance, motion, orientation, timing, or balance.

45. A method according to claim 41, wherein the piece of apparel is a foot-receiving device, and the stimulus is applied to the subject's foot.

46. A method according to claim 45, wherein the foot-receiving device is a piece of footwear.

47. A method according to claim 46, wherein the stimulus is a vibratory stimulus or a pressure stimulus.

48. A method, comprising:

placing a portion of a subject's body in or adjacent to a piece of apparel including at least a first stimulator device;

measuring at least a first parameter associated with the subject's performance, motion, orientation, timing, or balance; and selectively applying a stimulus to the portion of the subject's body via the first stimulator device based on the first parameter so as to affect the subject's performance motion, orientation, timing, or balance.

49. A method according to claim 48, wherein the stimulus includes at least one member selected from the group of: a vibratory stimulus, a pressure stimulus, and a temperature stimulus.

50. A method according to claim 48, wherein at least a first characteristic of the stimulus is based, at least in part, on the first parameter.

51. A method according to claim 50, wherein the first characteristic is selected from the group of: a location of the stimulus, an intensity of the stimulus, a duration of the stimulus, a starting time for the stimulus, an ending time for the stimulus, and a vibratory frequency for the stimulus.

52. A method according to claim 48, wherein the first parameter includes a member selected from the group of: impact, pressure, force, cadence, temperature, electrical current, and electrical resistivity.

53. A method according to claim 48, wherein the stimulus is applied to the portion of the subject's body so as to reflexively affect the subject's performance, motion, orientation, timing, or balance.

54. A method according to claim 48, wherein the stimulus is applied when the first parameter falls within a predetermined range.

55. A method according to claim 48, wherein the subject's motion is a cyclic motion, and at least a first characteristic of the stimulus depends, at least in part, on a phase of the subject's motion in the cycle.

* * * * *